Nov. 8, 1927.  1,648,693
J. W. McNAIRY
GAS DENSITY METER
Filed Oct. 31, 1925
Fig.1.
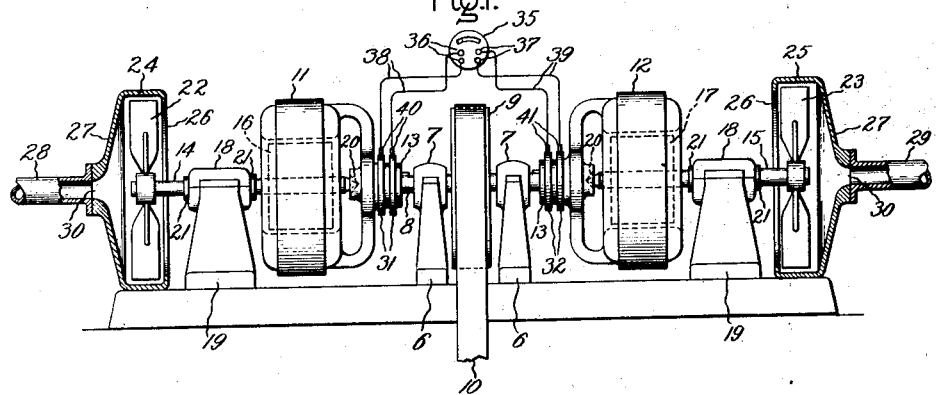
Fig.2.
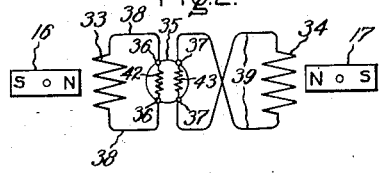
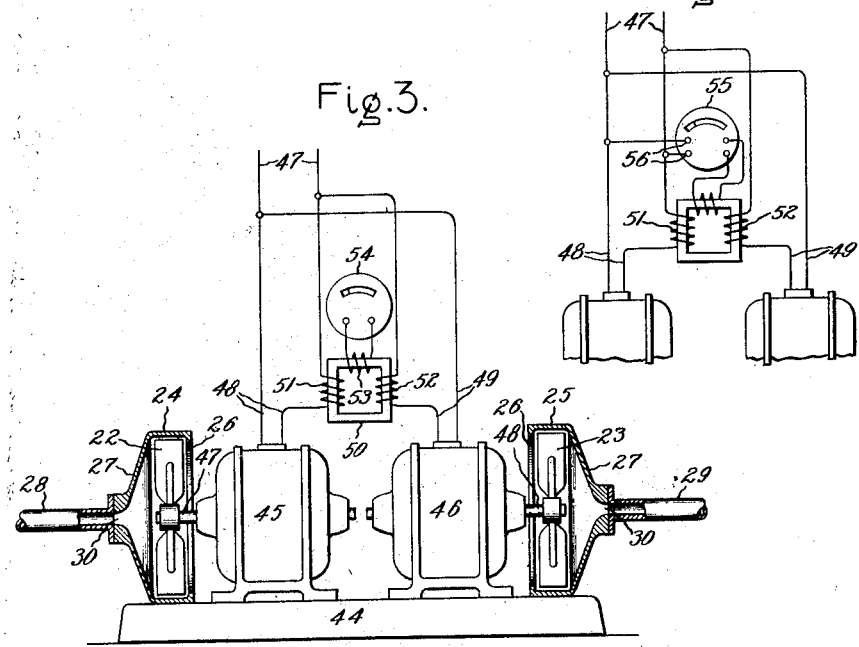
Fig.3.
Fig.4.
Inventor:
Jacob W. McNairy,
by
His Attorney.

Patented Nov. 8, 1927.

1,648,693

UNITED STATES PATENT OFFICE.

JACOB W. McNAIRY, OF SCHENECTADY, NEW YORK, ASSIGNOR, BY MESNE ASSIGNMENTS, TO BAILEY METER COMPANY, A CORPORATION OF DELAWARE.

GAS-DENSITY METER.

Application filed October 31, 1925. Serial No. 66,068.

The present invention relates to gas density meters and more particularly to a gas density meter for indicating or measuring the relative densities of two gases.

The object of the invention is to provide an improved gas density meter for this purpose, which is electrically operated, whereby it is adapted to remote measurement indications through easily extended electrical circuits, which permits standard electrical measurement instruments to be embodied therein as measurement devices, and which is simple in construction and reliable in operation.

In carrying out the invention, the torque required to accelerate a gas of a certain density by suitable impeller means is measured and compared by electrical means with the torque required to accelerate another gas of different density by a similar impeller means. By accelerating a gas is meant giving it increased velocity of flow by force applied to it, as by blowing or suction applied by a fan or impeller, for example. In the event that the density of one of the gases is known or may be taken as a standard of comparison, the density of the other gas may be determined with respect thereto or measured. This is based on the well known fact that the torque required to accelerate a gas is a function of its density, other related factors being constant.

The acceleration of the gases to be compared or measured is accomplished, in accordance with the invention, through the medium of dynamo-electric machines connected with separate impeller means for said gases to drive the same. The driving torque supplied to the impeller means is indicated or measured by an electric current or power-responsive device in circuit with the dynamo-electric machines, the circuit and device connected therein being arranged to provide an indication or measurement of the difference between the current or power supplied to drive the separate impeller means.

As the current or power supplied to or by a dynamo-electric machine bears a certain definite relation to the torque delivered to or by it, the indication or measurement obtained is proportional to the difference in the torque supplied to the impeller means and hence to the difference in density of the two gases. It will be seen that the measurement device or indicating means in circuit with the dynamo-electric machines may thus indicate or be calibrated to measure the relative gas densities which, in case the density of one of the gases is a known standard, is the density of the other or unknown gas.

For a further consideration of what is believed to be novel and the invention, attention is now directed to the accompanying drawing, the description thereof, and the appended claims.

In the drawing, Fig. 1 is a side view, partly in section, of a gas density meter embodying the invention; Fig. 2 is a diagrammatical representation of the electrical circuits in the meter of Fig. 1; Fig. 3 is a side view, partly in section, of a similar meter being a modification of that shown in Fig. 1, and Fig. 4 is a circuit diagram showing a modification in the instrument circuits of the meter of Fig. 3.

Referring to Fig. 1, 5 is a base plate for the meter, on which are mounted two spaced bearing pedestals 6 providing coaxially aligned bearings 7 for a driving shaft. A driving pulley 9 for the shaft is mounted thereon between the bearings and is driven from any suitable motor means of constant speed (not shown) by a belt 10. The pulley and belt represent any suitable means for driving shaft 8 and are shown only by way of example.

Mounted on the ends of shaft 8, which extend through and overhang bearings 7, are armature structures 11 and 12 of a pair of duplicate electric generators. The armature structures or armatures are secured to the shaft ends by heavy hubs 13 keyed thereto and face outwardly therefrom to provide open ends into which a pair of separate shafts 14 and 15 project in axial alignment with shaft 8.

The shafts carry the generator field structures or fields, indicated at 16 and 17, and are journalled in elongated bearings 18 provided in suitable bearing pedestals 19. Bearing pedestals 19 are mounted on base plate 5 closely adjacent the outer ends of the generators so that bearings 18 support the fields without excessive overhang. The inner ends of shafts 14 and 15 are cone-shaped and seat in cone-shaped bearings 20 provided in axial extensions of armature hubs 13, as a steadying means for said shafts. Collars, indicated at 21, are provided on shafts 14 and 15, at opposite ends of bearings 18 to prevent axial movement of said shafts.

On the outer ends of shafts 14 and 15 are mounted gas accelerating fans or impellers 22 and 23 respectively which operate in cylindrical casings 24 and 25 mounted on the base plate in axial aligment with said shafts. The casings are provided with open outlet ends 26 and conical inlet ends 27 between which the fans are located. Gases of differing densities are supplied to casings 24 and 25 through sampling conduits 28 and 29 respectively, which conduits are connected with central inlet openings 30 in the conical inlet ends of said casings.

In the gas density meter arrangement provided, the fans and casings are in duplicate at opposite ends of the base plate and represent any suitable duplicate gas accelerating means. In the present example the gas accelerating means are adapted to be shaft driven and are each connected with one element of a dynamo-electric machine, in this case with the field of a generator, while the drive shaft 8 carries the corresponding armatures, the arrangement being such that the generators are interposed between the drive shaft 8 or driving means and the gas accelerating means and operate as electromagnetic coupling means between said driving and driven means.

The generators used to provide the coupling may be of the alternating current or of the direct current type, although the alternating current type is preferred because it eliminates the use of commutators on revolving parts, and may be provided with permanent or electromagnet fields. In the present example the generators represent alternating current machines, the fields 16 and 17 being provided by simple permanent magnets as indicated in Fig. 2 and the armatures having single phase windings as indicated by collector or slip rings 31 and 32 which form the armature terminals. The slip rings are mounted on armature hubs 13 and are suitably insulated therefrom. The armature windings are not shown in Fig. 1 and are only indicated diagrammatically in Fig. 2. at 33 and 34 for the reason that they are similar to the stator windings usually provided in low voltage alternating current motors and generators and for the reason that the invention is not limited to any particular type of dynamo-electric machine as hereinbefore stated.

The manner in which the generators operate to provide the coupling between the power supply or drive shaft 8 and the gas accelerating means is as follows: Assuming shaft 8 to be driven at constant speed by the belt and pulley means, armatures 11 and 12 rotate together in the same direction about their respective fields which are connected with the impellers. The torque required by the impellers tends to hold the fields stationary, but as the armatures revolve about the fields, the field flux cuts the windings and generates voltages therein.

If the generators are permitted to deliver energy, currents circulate in the windings and exert the torque of the fields with the result that the fields rotate in response to the rotation of the armatures. The impellers rotate in the same direction as the armatures and, in the present example, are arranged to create a suction on the sampling conduits 28 and 29 so that the gases supplied to said conduits are drawn through the casings 24 and 25, that is, accelerated by the impellers, and discharged thereby through the open ends 26.

The value of the energy delivered by each generator and the current circulating in each armature depends upon the torque required to rotate the fields and their connected load, which is that provided by the impellers in accelerating the gases. With duplicate generators and impellers as provided in the present example, it will be seen that the circulating currents will be the same when the gases supplied to the impellers are of the same density.

A difference in the respective densities of the two gases being accelerated provides a difference in torque on the impellers in proportion thereto. This difference in torque results in a corresponding difference in energy output of the generators which may be indicated or recorded by suitable means in circuit with them, as a measure of the relative densities of the gases.

In the present example, the difference between the generator armature currents is taken as a measure of the difference in energy output of the generators and hence of the torque and of the respective gas densities, and is indicated by a double element ammeter 35 having separate sets of terminals 36 and 37 connected with collector rings 31 and 32 respectively by circuit wires 38 and 39 and brushes 40 and 41 respectively. The armature connections to the ammeter are, in effect, reversed with respect to each other as indicated in Fig. 2, although in the actual arrangement provided in Fig. 1, the connections are not shown as being reversed. This is for the reason that the generators are mounted in opposed relation to each other and therefore while rotating in the same direction are rotating electrically in opposite directions. Fig. 2 merely indicates the electrical relation between the armatures in connection with opposed windings or elements 42 and 43 of ammeter 35, a relation which may be provided in connection with any suitable double element indicating or recording devices which ammeter 35 represents.

By this arrangement the generators operate to provide an indication in opposition to each other, and the indicating or recording device connected with them responds to the difference in their electrical energy output which in the present example corresponds to the difference between their armature currents. The ammeter may be, and is preferably, an ordinary standard instrument, in which case it is calibrated to read in any suitable units as a measure of the respective densities of the gases.

In the use to which the meter is particularly well adapted, air is supplied to one of the sampling conduits, for example conduit 29, while flue gas containing $CO_2$ is supplied to the other, that is, to conduit 28. The gas alone provides the same torque or load on impeller 22 as the air does on impeller 22 because they are of substantially equal densities. Hence the ammeter records or indicates a zero reading for clear flue gas, but the presence of the heavier $CO_2$ in the flue gas places a greater load on impeller 22, thus increasing the torque thereon in proportion to the percentage of $CO_2$ present in the flue gas. The ammeter, responding to the difference in current set up by the unbalanced load or torque provides an indication in proportion to the unbalance. The ammeter is then calibrated in connection with measured percentages of $CO_2$ to indicate the percentage of $CO_2$ by direct reading.

Referring now to Fig. 3, and the modification shown therein, the gas impellers 22 and 23, together with their enclosing casings 24 and 25 respectively, are located at opposite ends of a short base 44 with a pair of suitable duplicate driving motors 45 and 46 mounted on the base between them. The impellers are arranged to be driven by the motors, and in the present example impeller 22 is mounted on the shaft 47 of motor 45 and impeller 23 is mounted on the shaft 48 of motor 46. The enclosing casings are provided with conical inlet ends 27 and central inlet openings 30 through which gas samples are taken from sampling conduits 28 and 29 as in the previously described embodiment. The gas samples are discharged from the impellers through the opposite open ends 26 of the casings.

The motors serve as coupling means through which the impellers are driven, much in the same manner as the generators of the above-mentioned embodiment. In this case, however, the driving means or source of driving energy is provided by a pair of electric supply mains 47 to which the motors 45 and 46 are connected by circuit wires 48 and 49 respectively.

The motors are of the alternating current single phase induction type as represented in the figure, and mains 47 supply alternating current thereto through circuit wires 48 and 49, although the invention is not limited to the use of alternating current and other types of motors may be used. It is desirable that the motors be in duplicate as indicated, as well as the impellers and fan casings, so that with gases of equal densities supplied to the impellers, the motors will take energy from the supply mains in equal amounts.

In the motor circuits are connected suitable means for measuring or indicating the energy input to the motors as a measure or indication of the relative torque values supplied by the motors to the impellers, which values as hereinbefore mentioned, vary in proportion to the density of the gases being accelerated. The means provided in the present example comprises a differential current transformer 50 having two primary windings 51 and 52 and a secondary winding 53 which last named winding is connected with an ammeter 54. The ammeter responds to the current set up in the secondary by currents flowing in the primary windings, which are connected into the motor circuits, primary winding 51 being connected in one leg of circuit wires 48 supplying motor 45 and primary winding 52 being connected in a corresponding leg of circuit wires 49 supplying motor 46.

The arrangement is such that the current flowing in one primary winding opposes the other in its inductive effect upon the secondary. This provides for a zero indication of the ammeter when the motors are equally loaded, that is, when they take equal current values. As the current which each motor takes is an indication of the power or energy supplied to it, it will be seen that the ammeter will register zero when the impellers are accelerating gases of equal densities.

With gases of unequal densities, such as air and flue gas containing $CO_2$, the motors are correspondingly unequally loaded in proportion to the percentage of $CO_2$ present in the flue gas, and a current will be set up in the secondary and through the ammeter corresponding to the difference between the current values supplied to the motors. In any case the greater the difference in gas densities, the greater will be the difference between the current values in the respective primary windings and in the ammeter. The ammeter may then be calibrated, like that of the embodiment shown in Fig. 1, to read in any suitable units as a measure of the relative gas densities and in the case of air and flue gas containing $CO_2$, may be made to read $CO_2$ content directly.

In this connection it may be said that the differential transformer 50 permits the use of a simple current-responsive device such as the single element ammeter 54 which is of standard construction, although the double element ammeter 35 shown in Figs. 1 and 2 serves the same purpose, while eliminating the transformer.

From the foregoing description it will be seen that the gas density meter of Fig. 3 is essentially the same as that of Fig. 1, that is, both comprise a pair of gas accelerating means for separately accelerating gases of differing densities and dynamo-electric machines through which the accelerating means are driven and in circuit with which are connected suitable means responsive to the difference in the energy values supplied through them to the gas accelerating means. In both embodiments, advantage is taken of the fact that the energy required to move or accelerate a gas corresponds to its density, and that with rotary impeller means the torque required to move or accelerate a gas also corresponds to its density, other factors being constant. It is desirable therefore to drive the meter of Fig. 1, that is, shaft 8, at a constant speed and to supply energy to the meter of Fig. 3 at constant frequency and voltage through mains 47, so that the only variable factors are the densities of the gases or in the usual case, the density of one of the gases.

While an ammeter has been provided in both embodiments as the means responsive to the difference in torque and hence of the relative gas densities, the invention is not limited thereto, as it will readily be appreciated that as its function is to provide an indication of the difference in torque or energy supplied to the separate gas impeller means as a measure or indication of the relative gas densities in connection with the dynamo-electric machines through which the impeller means are driven, any suitable means providing indications or measurements for the same purpose may be used.

For example as indicated in Fig. 4, a wattmeter 55 may be substituted for ammeter 54, the wattmeter having additional voltage coil terminals 56 which are connected with the same source of energy or voltage as supplies the motors, that is, with mains 47. The wattmeter is used preferably in connection with energy sources of varying voltage to prevent such voltage variations from appreciably affecting the measurement indication, since the wattmeter is responsive to the differential power required to drive the impellers and not to slight voltage variations. This is not true of the ammeter such as shown in Fig. 3.

The wattmeter thus permits the meter arrangements to be used in connection with the usual energy sources, which are usually of constant frequency but of slightly varying voltages, without providing voltage regulating means to obtain accurate measurement indication. The wattmeter may, of course, be a standard instrument like any other indicating or recording instrument capable of use in the meter arrangement shown, such as the ammeter 54, and is calibrated in like manner.

The use of standard instruments and the possibilities of remote gas density measurement indications through an extension of the instrument circuits are desirable features of the meter of the present invention, which in itself is of simple construction comprising essentially two impellers and two simple dynamo-electric machines through which the impellers are driven.

What I claim as new and desire to secure by Letters Patent of the United States, is:

1. In a gas density meter, the combination of a pair of gas accelerating impellers, means providing a common source of power for driving said impellers, a pair of dynamo-electric machines through which the impellers are separately driven from said source of power, and electrical indicating means in circuit with said machines for indicating the difference in electrical energy transmitted through said machines as a measure of the difference of the torque required to drive the impellers and the difference in the densities of gases accelerated by said impellers.

2. In a gas density meter, the combination of means for separately accelerating gases of differing densities, means providing in connection with said first-named means a common source of power, and electrical means connected with the first-named means for indicating the difference in torque required to accelerate said gases.

3. In a gas density meter, the combination of means for separately accelerating gases of differing densities, electrical means connected therewith for indicating the difference in torque required to accelerate said gases, said means including a pair of dynamo-electric machines through which the accelerating means are separately driven, means providing a constant source of power with which said machines are jointly connected, and an electrical meter differentially connected in circuit with said machines.

4. In a gas density meter, the combination with a pair of dynamo-electric machines, each having a rotor and an electrical circuit through which electric energy flows in response to load on the rotor, of a gas accelerating means connected with the rotor of each of said machines to provide a load thereon, means providing a constant source of power with which said machines are jointly connected, and electrical indicating means connected in circuit with said machines.

5. In a gas density meter, the combination with a pair of dynamo-electric machines, each having a rotor and an electrical circuit through which electric energy flows in response to load on the rotor, of a gas accelerating means connected with the rotor of each of said machines to provide a load thereon, means connected with said machines for jointly supplying power thereto to drive the rotors, and means connected with said electrical circuits for indicating the difference in energy flow therein.

6. In a gas density meter, the combination of a gas accelerating means comprising duplicate impellers, casings therefor and means for supplying gases to said casings, a common driving means for said impellers connected therewith, a duplicate dynamo-electric machine interposed in the connection between each impeller and said driving means, and an electrical indicating instrument connected with said dynamo-electric machines.

7. In a gas density meter, the combination of a gas accelerating means comprising duplicate casings having open outlet ends and conical inlet ends and an impeller located between said ends, a common driving means for said impellers, duplicate dynamo-electric machines connected with said impellers and said driving means to provide duplicate electromagnetic couplings between the latter and the impellers, and an electrical indicating instrument connected with said dynamo-electric machines.

In witness whereof, I have hereunto set my hand this 30th day of October, 1925.

JACOB W. McNAIRY.